Figure 3:
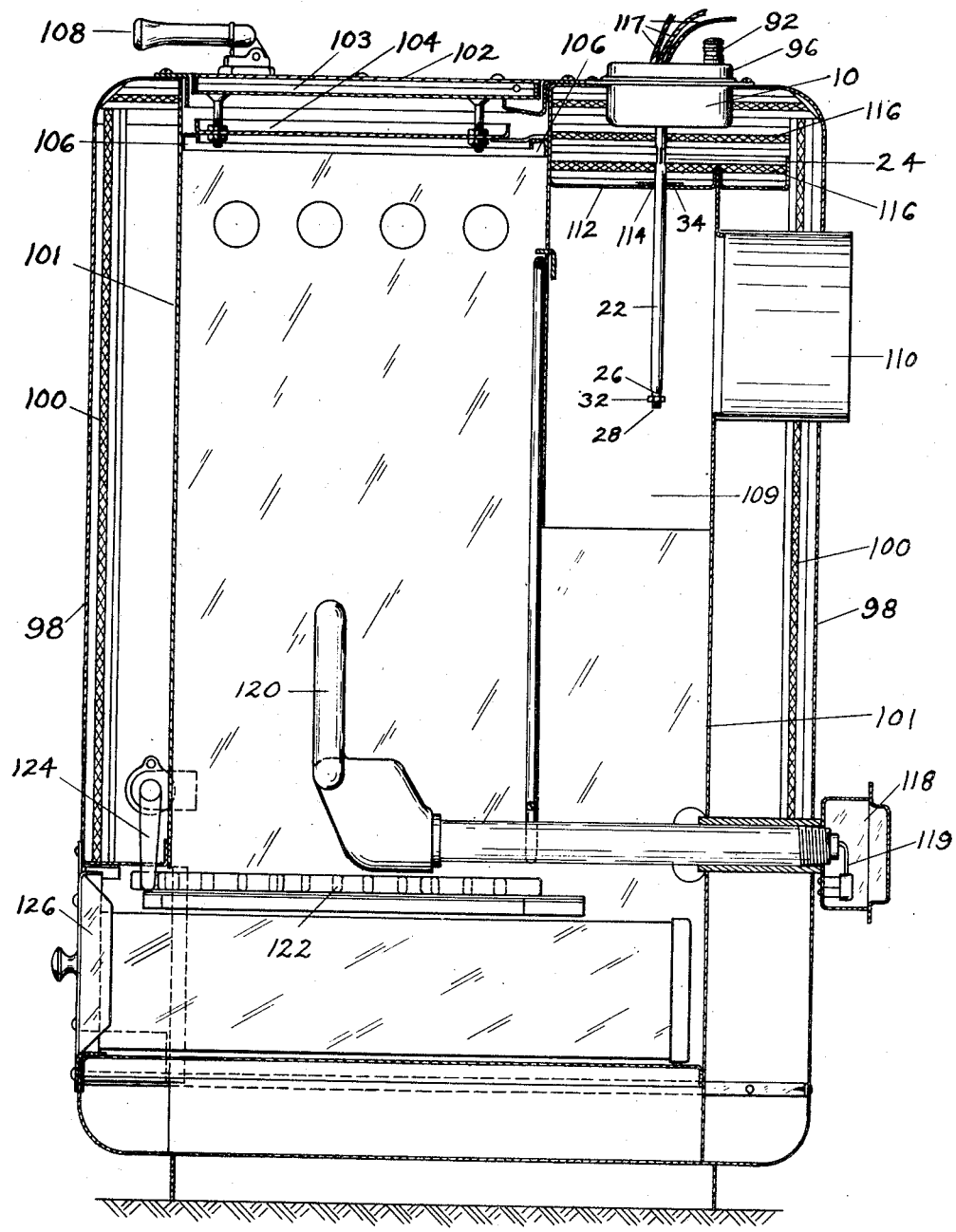

April 17, 1951 L. M. PERSONS 2,549,517
THERMOSTATIC SWITCH
Filed July 31, 1947 3 Sheets-Sheet 1
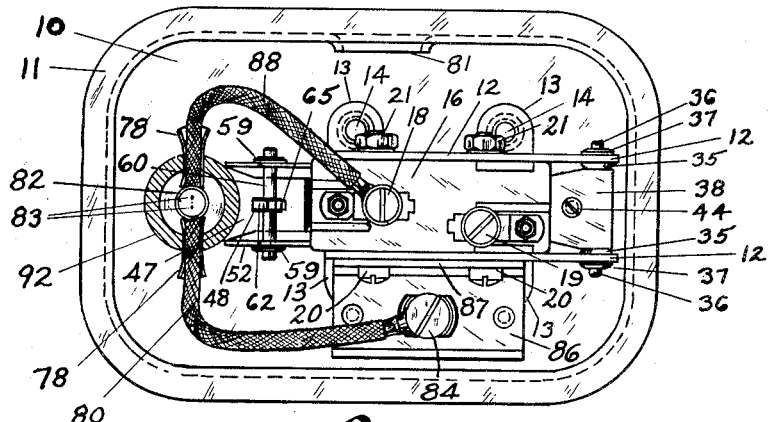
Fig. 1
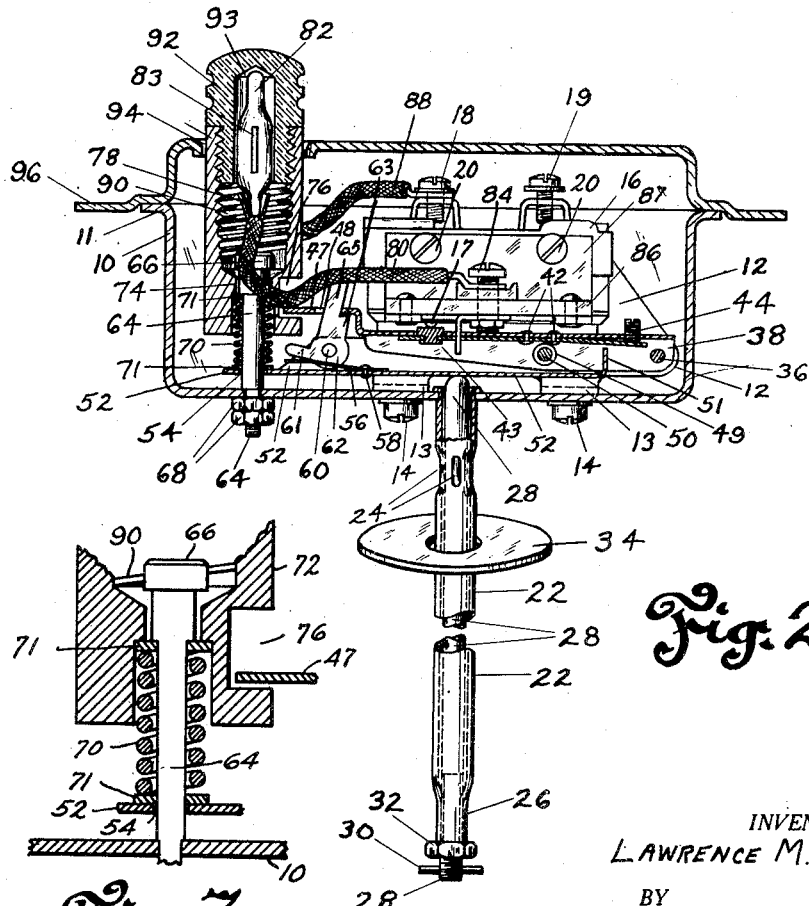
Fig. 2
Fig. 7
INVENTOR.
LAWRENCE M. PERSONS
BY
Roy M. Eilers
ATTORNEY.

INVENTOR.
LAWRENCE M. PERSONS
BY
Roy M. Eilers
ATTORNEY.

April 17, 1951 L. M. PERSONS 2,549,517
THERMOSTATIC SWITCH
Filed July 31, 1947 3 Sheets-Sheet 3
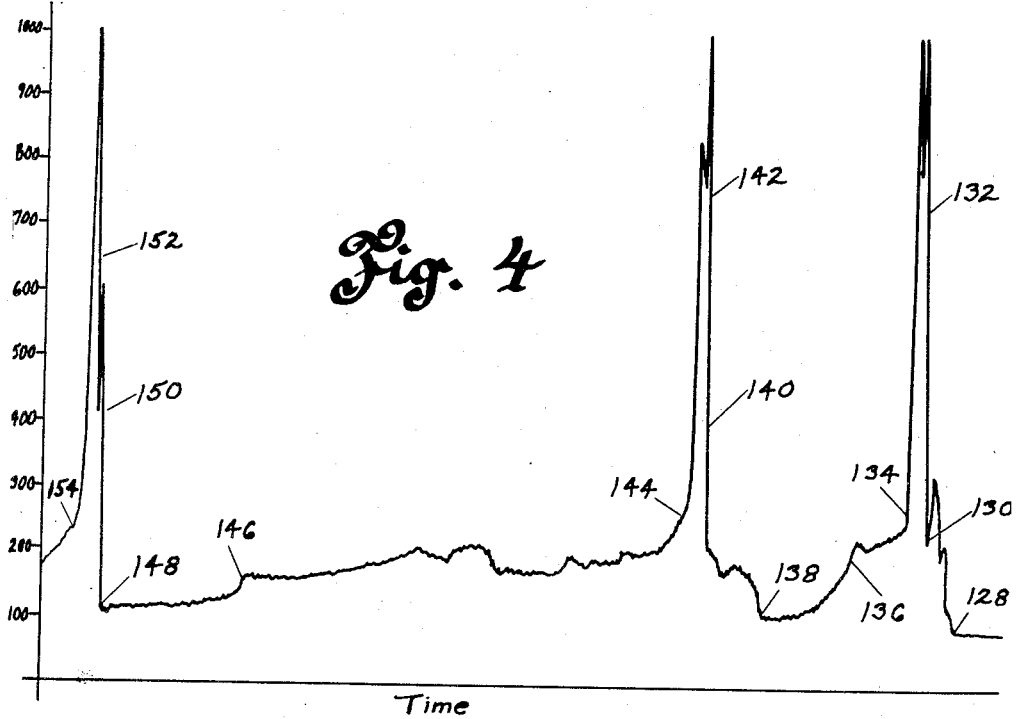
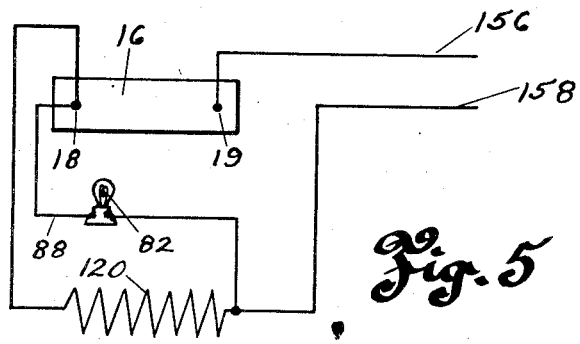
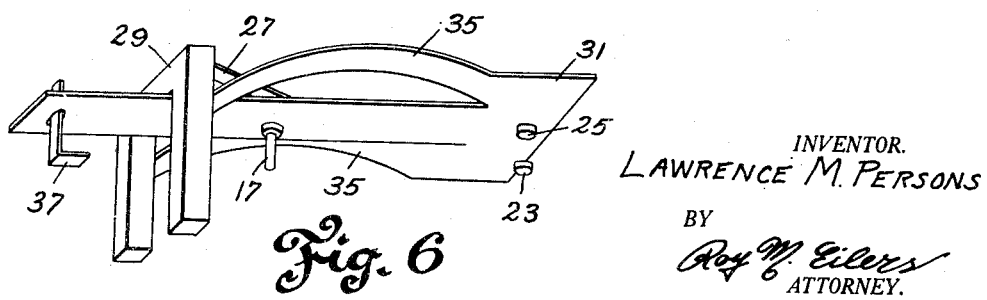
INVENTOR.
LAWRENCE M. PERSONS
BY
Roy M. Eilers
ATTORNEY.

Patented Apr. 17, 1951

2,549,517

UNITED STATES PATENT OFFICE 2,549,517

THERMOSTATIC SWITCH

Lawrence M. Persons, Chesterfield, Mo., assignor to McQuay-Norris Manufacturing Company, St. Louis, Mo., a corporation of Delaware Application July 31, 1947, Serial No. 765,164

7 Claims. (Cl. 200—137)

This invention relates to improvements in control devices. More particularly this invention relates to improvements in control devices that are operable to control the energization and de-energization of a source of heat.

It is therefore an object of the present invention to provide an improved control device that is operable to control the energization and de-energization of a source of heat.

In some installations where the energization and de-energization of a source of heat is controlled in response to the temperature in a heated chamber or space, a thermally responsive element is placed in that chamber or space and permitted to energize the source of heat whenever the temperature in the chamber or space falls below a predetermined value and to de-energize that source of heat whenever the temperature in the space or chamber rises above the predetermined value. Examples of such installations are found in house heating systems, electric and gas stoves, and electric heating pads. In such installations the source of heat is initially energized by manual or timed means, and thereafter the energization and de-energization of the source of heat is controlled by the thermally responsive element until the source of heat is finally de-energized by the manual or timed means. In other installations where the energization and de-enrgization of a source of heat is controlled in response to the temperature in a heated chamber or space, a thermally responsive element is placed in that chamber or space and permitted to energize the source of heat whenever the temperature in the chamber or space is between predetermined limits and to de-energize that source of heat whenever the temperature in that space or chamber exceeds or falls below those limits. One example of this latter type of installation is found in electrically heated garbage disposal units.

In the operation and use of electrically heated garbage disposal units, it is customary to wrap the garbage in paper and then place the wrapped garbage in the disposal unit. The outer layers of paper will usually be dry and will ignite and burn rather readily; but the inner layers of paper and the garbage itself will usually be rather damp and will not ignite readily. It is therefore desirable to provide a source of heat which will act to dry out all of the paper and all of the garbage, and then cause the paper and garbage to ignite and burn. Such a source of heat can be an electric heating element; and that element can be energized by the person who places the garbage in the disposal unit. Once the heating element is energized it should supply enough heat to maintain the temperature in the garbage disposal unit at a level that is sufficiently high to dry out the garbage; and yet the heating element should not be permitted to operate continuously, as such operation would be wasteful of current. It would not be practical to expect the users of the disposal unit to wait until the garbage had been burned and then to de-energize the heating element; because it can take several hours for a sizable quantity of damp garbage to be completely consumed. Similarly it would not be practical to expect the users of the disposal unit to return after an hour or so to de-energize the heating element, because the users might forget to do so or they might de-energize the heating element before all the garbage was completely consumed. Moreover, a timing device would not be practical since it would probably de-energize the heating element before or after, rather than at the time, the garbage was consumed. To be efficient, the garbage disposal units should cause the heating elements to maintain a minimum temperature in the units as long as there is any garbage to be disposed of, and thereafter they should promptly de-energize the heating elements. It is, therefore, an object of the present invention to provide a garbage disposal unit wherein a minimum temperature is maintained until the garbage has burned.

The present invention makes this possible by providing a control device that responds to the temperature in the garbage disposal unit to maintain a minimum temperature in that unit as long as there is garbage to be consumed, and that de-energizes the heating element as soon as all of the garbage has been consumed. This requirement means that the control device must tend to de-energize itself whenever the temperature in the unit falls below a predetermined value at the end of a garbage disposal cycle, and yet must be capable of providing heat for the disposal unit when the temperature in that unit is below the predetermined value at the beginning of the garbage disposal cycle. The present invention meets this requirement by providing a control that has a latch which tends to hold open the circuit of the heating element whenever the temperature in the disposal unit is below a certain value, but which can be tripped to permit closing of the circuit at the beginning of a garbage disposal cycle. It is, therefore, an object of the present invention to provide a control device for garbage disposal units which has a latch that tends to hold open the heater circuit at low temperatures, but which can be tripped to permit closing of the heater circuit at low temperatures.

The control device of the present invention will de-energize the heating element of the garbage disposal unit whenever all of the garbage in that unit has been consumed. This effects a considerable saving in electricity and it also increases the overall length of life of the heating element, because garbage disposal units are not ordinarily used on a twenty-four hour basis. Instead, such units are used most frequently in the neighborhood of meal times; and it usually happens that the housewife, either shortly before or shortly after each meal, gathers together the excess food and garbage involved in making the meal, wraps it in paper, and deposits it in the garbage disposal unit. At the time the housewife deposits the wrapped garbage in the garbage disposal unit, the control device will be holding the heating element in a de-energized state by means of the latch. Upon depositing the wrapped garbage in the disposal unit, the housewife will operate the push button of the control device and trip the latch; thus enabling the control device to energize the heating element. Such energization will cause the garbage and its wrappings to dry out and ignite, and such ignition will cause the latch of the control device to be reset; whereupon the latch can again cause de-energization of the heating element when the temperature in the disposal unit again falls below the predetermined value. In this way, the housewife need only deposit the wrapped garbage and press the push button of the control device; and thereafter the control device automatically dries and burns the garbage and then de-energizes the heating element. This makes the operation of the garbage disposal unit simple but certain. It is, therefore, an object of the present invention to provide a control device with a latch that tends to hold open the heater circuit at temperatures below a predetermined lower unit, that can be tripped to close the heater circuit at the beginning of a garbage disposal cycle, and that is reset during the garbage disposal cycle.

Some of the ingredients of the garbage, and the papers in which the garbage is wrapped, tend to burn quickly and with considerable evolution of heat. While this evolution of heat is considerable, it is not of such magnitude that it could, by itself, injure the heating element of the garbage disposal unit. Similarly, the heat which is generated by the heating element is considerable, but it too is not of such magnitude that it could, by itself, injure the heating element. However, the combined heat from the heating element and the rapidly burning paper or garbage might possibly be sufficient to injure the heating element. The present invention completely obviates any such injury to the heating element by enabling the control device to de-energize the heating element when the temperature in the garbage disposad unit exceeds a predetermined upper limit. At such time the heat from the rapidly burning paper and garbage will continue to act upon the heating element; but that heat, in the absence of heat from the heating element, cannot injure that element. As the heat from the rapidly burning paper and garbage dissipates, the control device will again energize the heating element; and it will keep that element energized until the temperature in the disposal unit rises above the predetermined upper limit or falls below the predetermined lower limit. This arrangement maintains the temperature required to dry out and ignite the garbage and yet prevents excessive heating of the heating element. It is, therefore, an object of the present invention to provide a control device that will de-energize the heating element of a garbage disposal unit whenever the temperature in that unit rises above a predetermined upper limit or falls below a predetermined lower limit.

Other objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

In the drawing, Fig. 1 is a plan view of a control device that is made in accordance with the principles and teachings of the present invention, and it shows that device as it appears when the cover plate therefor is removed.

Fig. 2 is a partially-sectioned, side elevational view of the control device shown in Fig. 1, Fig. 3 is a partially-sectioned, side elevational view of an electric garbage disposal unit in which the control device of Figs. 1 and 2 is mounted, Fig. 4 is a chart which shows the variations in temperature which can be experienced within the garbage disposal unit of Fig. 3, Fig. 5 is a schematic diagram of the electric circuit for the control device and the heating element of the garbage disposal unit.

Fig. 6 is a perspective view of the principal elements of the switch in the control device of Fig. 1, and Fig. 7 is a partially sectioned, enlarged view of a portion of the control device of Fig. 1.

Referring to the drawing in detail, the numeral 10 denotes a casing which supports and encloses a control device made in accordance with the principles and teaching of the present invention.

The casing 10 is rectangular in form and is deep enough to enclose the control device; and upper edges of the walls thereof are provided with a horizontally disposed flange 11. A pair of vertically disposed brackets 12 are secured to the bottom of the casing 10 by means of machine screws 14; and these screws extend upwardly through openings in the bottom of casing 10 and are seated in threaded openings in the feet 13 of brackets 12. The brackets 12 are secured to the casing 10 in such a way that the upper ends of the brackets are spaced apart; and a self-contained, quick-make and quick-break switch 16 is positioned between the upper ends of brackets 12. Switch 16 is held in position between the upper ends of brackets 12 by means of bolts 20 and nuts 21. The switch 16 has an operating button 17 that controls the engagement and disengagement of the electrical contacts 23 and 25 within the switch 16. Those electrical contacts are biased to closed-circuit position by a spring 27 which is held at one end by pivot block 29 and has its free end pressing against the flexible contact-carrying blade 31 not shown; and when those contacts are in closed-circuit position, the button 17 will project below the lower edge of the switch 16. When the electrical contacts of switch 16 are in open-circuit position, the operating button 17 will be in the retracted position shown in Fig. 2. The switch 16 is provided with terminals 18 and 19 which are connected to the electrical contacts within the switch 16; and movement of the button 17 makes or breaks a circuit through the terminals 18 and 19. Quick movement of contact 25 is assured by the interaction of notches 33 in pivot block 29 and the bent and stressed cantilever arms 35 of flexible blade 31 which snaps the blades 31 to either of two over-center positions. The semi-fixed end of blade 31 pivots about current-carrying support 37.

Also secured to the casing 10 is an elongated cylinder 22. This cylinder is made of a material which can be subjected to flames and heat without injury and which has a relatively high thermal coefficient of expansion. One material from which cylinder 22 can be made is stainless steel, but obviously other materials can also be used. The cylinder 22 fits into an opening in the bottom of the casing 10, and it is secured to the casing 10 by having the upper end thereof riveted over. In addition, the upper end of cylinder 22 can be soldered or brazed to the bottom of the casing 10. The elongated cylinder 22 has a plurality of bumps or inwardly extending projections 24 formed in the wall thereof adjacent its upper end, and these bumps project inwardly from the inner periphery of the cylinder 22 and serve as guides for a rod 28 which is positioned within the cylinder 22. The rod 28 is made of a material that can be subjected to heat without injury and that has a thermal coefficient of expansion which is less than the thermal coefficient of expansion of cylinder 22. One material from which rod 28 can be made is Invar, but obviously other materials could be used. The difference between the thermal coefficients of expansion of cylinder 22 and rod 28 will cause the upper end of rod 28 to move relative to the upper end of cylinder 22, and that movement will be guided by the bumps 24 of cylinder 22. The bumps 24 are so dimensioned relative to the diameter of the rod 28 that the rod 28 will be guided by the bumps 24 but can move without binding. The lower end of the rod 28 is threaded, and it fits within the internally threaded, reduced-diameter section 26 of the cylinder 22. As a result, rotation of the rod 28 relative to the cylinder 22 will cause movement of the smoothly rounded upper end of rod 28 relative to the bottom of the casing 10, thus permitting calibration of the control device. A pin 30 extends through the bottom of the rod 28 to facilitate ready adjustment of the position of the rod 28 relative to the position of the cylinder 22; but once the desired adjustment has been attained, further rotation of the rod 28 relative to the cylinder 22 is prevented by rotating the nut 32 against the bottom of the cylinder 22. Such rotation of the nut 32 will lock the lower ends of rod 28 and cylinder 22 together; and the rod 28 and cylinder 22 are additionally held against relative movement by soldering or brazing the nut 32 to the cylinder 22. A circular washer 34 is slipped over the exterior of the cylinder 22; and the central opening in that washer is made to fit the cylinder 22 rather closely although it does not keep the washer 34 from moving axially of the cylinder 22.

The right hand ends of the spaced brackets 12 support a transversely extending pin 36, and that pin rotatably supports an actuating lever 38. The lever 38 is U-shaped in configuration; the arms of the U extending downwardly and being provided with openings through which the pin 36 passes. The ends of the pin 36 are positioned in openings in the right hand end of spaced brackets 12; and the pin 36 is held fixedly in position relative to the spaced brackets 12 by means of locking washers 37. The lever 38 is spaced inwardly of the brackets 12 by spacing washers 35, and it can rotate relative to brackets 12 and casing 10. A leaf spring 40 is carried on the under surface of the closed section of the U of lever 38, and that spring is secured to the lever 38 by means of rivets 42 and a button 43. The right hand end of the leaf spring 40 extends to the right of the rivets 42, and that end of the spring 40 can act as a cantilever beam. A set screw 44 is threadably seated in the right hand end of the lever 38, and the lower end of that screw bears against the right hand end of the leaf spring 40. Proper adjustment of the set screw 44 relative to the lever 38 will create a predetermined amount of tension in the leaf spring 40; and once the proper amount of tension has been attained, the set screw 49 can be soldered or brazed to the lever 38.

The button 43 of lever 38 not only serves to hold leaf spring 40 in assembled relation with lever 38, but it also serves to bear against and act upon button 17 of switch 16. Whenever lever 38 is rotated a sufficient distance in a clockwise direction the button 43 will force button 17 upwardly, breaking the circuit between terminals 18 and 19; and whenever lever 38 is rotated a sufficient distance in a counter-clockwise direction the button 43 will permit the button 17 to move downwardly, making the circuit between terminals 18 and 19. The left hand end of lever 38 extends beyond the button 17 of switch 16 and terminates in a tongue 47 which is spaced a short distance above the rest of lever 38; and the tongue 47 is provided with a longitudinally-extending slot 48. An opening 49 is provided in each of the downwardly depending side walls of the lever 38 intermediate the button 43 and the pin 36, and those openings are large when compared to a transversely extending pin 50 which extends through those openings and is fixedly held by the spaced brackets 12. The size of the openings 49 permits limited rotation of lever 38 relative to brackets 12.

The pin 50 supports a second actuating lever 52, and this lever also is U-shaped in configuration. The sides of lever 52 extend upwardly from the closed section of the U, and the sides are provided with openings that receive the pin 50. The upwardly extending side walls of lever 52 are spaced apart a distance greater than the distance between the downwardly depending side walls of the lever 38; and the lever 38 fits down between the side walls of lever 52. Moreover, the pin 50 is set far enough above the bottom of lever 52 that the side walls of lever 38 do not touch the bottom of lever 52. A projection 51 is provided at the right hand end of lever 52, and that projection 51 is quite narrow and extends up between the spaced side walls of lever 38. The lever 52 can rotate around pin 50; and counter-clockwise rotation of lever 52 for a sufficient distance will move the projection 51 into engagement with the spring 40 carried by lever 38. The lever 52 has an opening 54 in the left hand end thereof; and it has a leaf spring 56 that is spaced to the right of that opening. The leaf spring 56, which has its right hand end secured to the lever 52 by rivets 58, has its left hand end bent upwardly from lever 52. The center of the spring 56 has a longitudinally extending slot therein. A pin 60 is seated in openings in the spaced side walls of lever 52, and that pin is positioned above the center of leaf spring 56. The pin is held in position by locking washers 59, and the pin rotatably supports a latch 62. The latch 62 has a rounded bottom which fits into the longitudinally extending slot of leaf spring 56, and it has a projecting arm 61 against which the left hand end of leaf spring 56 bears. The latch 62 has a projecting shoulder 63 thereon that can pass through the longitudinally extending slot 48 in the tongue 47 of lever 38 but which is biased for engagement with the under surface of tongue 47, as shown in Fig. 2. The latch 62 also has a guiding projection 65 which extends up through slot 48 of tongue 47, and that projection limits the rotation of latch 62 relative to tongue 47. The latch 62 will ordinarily be in the position shown in Fig. 2, with the shoulder 63 underlying the tongue 47 of lever 38, and leaf spring 58 always biases latch 62 toward that position; but latch 62 can be rotated in a counter-clockwise direction to move the shoulder 63 into register with the slot 48 in the tongue 47 of lever 38, thus permitting the slot 48 to telescope down over the shoulder 63.

A stud 64 is provided at the left hand side of the casing 10, and that stud has a threaded end which projects through an opening in the bottom of the casing 10. Nuts 68 are threaded onto the lower end of stud 64, and those nuts hold the stud 64 rigid relative to the casing 10. The upper end of the stud 64 is provided with a head 66 that has a diameter appreciably larger than the diameter of the stud 64. A helical spring 70 surrounds the stud 64, and the ends of spring 70 press against washers 71. The upper washer 71 bears against a shoulder on stud 64 and cannot move upwardly, but the lower washer 71 rests on the left hand end of lever 38 and can move downwardly with that lever. As a result, the helical spring 70 will exert a biasing force on lever 38 that tends to rotate that lever in a counter-clockwise direction. The enlarged head 66 of the stud 64 extends upwardly into a cylindrical push button 72; and push button 72 has a threaded recess which is larger than the head 66 of stud 64 and an opening 74 which is smaller than the head 66 of stud 64. As a result, when the threaded end of stud 64 is passed through the opening 74 in push button 72 and is held by nuts 68 below the opening in the bottom of casing 10, the push button 72 will be held in assembled relation with casing 10. However the push button 72 can move vertically relative to the stud 64 for limited distances. The upper washer 71, which bears against a shoulder on stud 64, also bears against a shoulder on the interior of push button 72, thus biasing the push button toward the position shown in Fig. 2. The push button 72 has a notch 76 at one side thereof, and that notch receives the tongue 47 of lever 38 and permits movement of push button 72 without touching lever 38. The bottom of the push button 72 overlies the projecting arm 61 of latch 62, and downward movement of the push button 72 will cause the latch 62 to rotate in a counter-clockwise direction; thus moving the shoulder 63 into register with the slot 48 of the tongue 47, and permitting the tongue 47 to move down and telescope over the shoulder 63.

Vertically disposed slots are provided in the side walls of push button 72, but those slots are obscured by the sheet 78 of insulation which is folded and slipped into those slots. The sheet 78 of insulation protects the wire 80 from chafing while permitting the wire 80 to pass through the slots to the lamp 82. The lamp 82 is positioned within the push button 72 and it has electrodes 83. The wire 80 extends from one of the terminals of the lamp 82 to a terminal 84 which is secured to a horizontally disposed plate 86 of insulation. The plate 86, in turn, is secured to a vertically disposed bracket 87 that is bolted to brackets 12 by nuts and bolts 20 and 21 and that has feet to which plate 86 is riveted. A second wire 88 is connected to the other electrode of lamp 82, and that wire extends to terminal 18 of switch 16. An opening 81 is provided in the side wall of the casing 10, and that opening permits the insertion of wires into the casing for connection to the terminals 18, 19 and 84. The internal thread 90 of the threaded recess in push button 72 receives an exteriorly threaded lamp housing 92 which is of transparent material. The lamp housing 92 has an internal recess 93 which accommodates the upper portion of the lamp 82; and the lamp housing 92 fits through an opening 94 in the cover plate 96 that overlies the casing 10.

The control device of the present invention can be used in various types of installations, but one installation for which it is particularly suited is an electric garbage disposal unit. The numeral 98 denotes the outer wall of one such unit, and that wall is provided with strips or boards 100 of insulation. A second wall or shell 101 is positioned within the outer wall 98, and it protects the insulation 100 from direct contact with the flames in the unit. The top of the garbage disposal unit is provided with a door 102 that is hinged at its right hand end, and that door is provided with a strip or board 103 of insulation. The door 102 is also provided with an inner wall or "fire stop" 104 that is spaced inwardly of the insulation 103. The inner wall 104 is smaller than the door 102, to facilitate its movement through the opening in the top of the unit; and that wall rests upon an inner frame 106. The engagement between the inner wall 104 and the inner frame 106 is tight, and it will protect the user of the garbage disposal unit from flames and fumes.

A handle 108 is hinged to the door 102 of the unit, and this handle can be grasped readily and used to open the door 102. A flue 109 is provided at the right hand side of the garbage disposal unit, and that flue is connected to an outlet port 110. The port 110 may be connected to a chimney or other conduit that will convey the flames and fumes to the exterior of the structure in which the unit is operated. A shelf or platform 112 is provided at the top of the flue 109, and that shelf has an opening 114 therethrough to receive the cylinder 22 of a control device. That opening is made large to facilitate adjustment of the position of the control device, but the washer 34 overlies that opening and keeps flames and fumes from passing therethrough. Strips or sheets 116 of insulation are provided above the shelf 112, and those strips or boards are each provided with an opening that can receive the cylinder 22 of the control device. Other strips or boards of insulation surround the casing 10 of the control device. The cover plate 96 and the lamp housing 92 will extend above the top of the garbage disposal unit. Also shown as extending above the top of the unit are leads 117, and these leads will extend downwardly to the junction box 118 of electrical heating element 120. If desired, of course, the leads 117 can be positioned entirely within the outer wall 98 of the unit.

The heating element 120 is connected to the junction box 118 by conductors 119, and those conductors are to be selectively connected to a source of current by the switch 16 of the control device. A grate 122 is positioned below the heating element 120, and that grate is provided with a shaker arm 124. The outer end of the shaker arm 124 extends out beyond the outer wall 98 of the garbage disposal unit and can be actuated by a suitable handle, not shown. A cleanout door 126 is provided in the front wall 98 of the unit, and that door can be opened to permit ready removal of whatever ashes and residue are not consumed by the fire in the unit and fall down through the grate 122.

Garbage disposal units of the type disclosed in Fig. 3 are not usually called upon to burn garbage continuously, but instead are usually required to operate intermittently during the day. To avoid needless consumption of current at times when no garbage is to be burned, the control device automatically de-energizes the heating element 120 at the end of each garbage disposing cycle. Accordingly, the various component parts of the control device will normally be in a de-energized position, as shown in Fig. 2. At such times, the central rod 28 will be holding the left hand end of lever 52 up against the force exerted by helical spring 70; and the lever 52 will, through the action of latch 62, be holding the button 43 of lever 38 up against the button 17 of switch 16. The button 17 is biased to closed circuit position, but it will be held in retracted or open circuit position by the button 43 of lever 38. In the absence of some change induced by outside forces, the control device will remain in this condition indefinitely.

Whenever the garbage disposal unit is to be used, the door 102 is opened, the wrapped garbage is placed on the grate 122, and the transparent lamp housing 92 is pressed down. The downward movement of lamp housing 92 causes the lower edge of push button 72 to move downwardly and strike the projecting arm 61 of the latch 62, thus causing that latch to rotate in a counter-clockwise direction. Such rotation permits the shoulder 63 of the latch 62 to move into register with the slot 48 in the tongue 47 of lever 38, thus permitting the spring, not shown in switch 16, to move button 17 and lever 38 downwardly. As the button 17 of switch 16 moves downwardly, the electrical contacts in the switch 16 will complete the circuit between terminals 18 and 19, thus causing the energization of the heating element 120 and the illumination of lamp 82. This lamp gives a visual indication of the beginning and duration of each garbage disposal cycle. The energization of the heating element 120 will increase the temperature in the unit; and as that temperature increases, the garbage and the paper in which it is wrapped will dry out and begin to burn, further increasing the temperature in the flue 109 of the garbage disposal unit. The cylinder 22 and the rod 28 of the control device will be subjected to this change in temperature and will begin to expand and elongate. The cylinder 22 will expand and elongate more than the rod 28 will expand and elongate; thus causing the smoothly rounded upper end of rod 28 to move downwardly. This downward movement permits the spring 70 to rotate lever 52 in a counter-clockwise direction. Such rotation will cause the latch 62 to move downwardly, and if the temperature rises to a sufficient value the shoulder 63 of latch 62 will move down through slot 48 of tongue 47; and at such time, the leaf spring 56 will act on the under side of arm 61 of latch 62 to move shoulder 63 under the tongue 47, as shown in Fig. 2. This action resets the latch 62; and it enables the control device to continue the heating of the garbage until it is consumed and then to open the circuit of the heating element 120 when the temperature in the flue 109 decreases below a predetermined point and restores cylinder 22 and rod 28 to the position shown in Fig. 2.

If the temperature in the flue 109 continues to rise, the smoothly rounded end of rod 28 will continue to move downwardly and will continue to permit counter-clockwise rotation of lever 52 by the helical spring 70; and that rotation will move the upstanding projection 51 at the right hand end of lever 52 toward leaf spring 40 on the under side of lever 38. Still further increases in temperature will cause still further rotation of lever 52 and can cause the projection 51 on lever 52 to engage and press upwardly on leaf spring 40, thus causing clockwise rotation of lever 38. Such rotation can cause button 43 to force button 17 into the position shown in Fig. 2, thus causing button 17 to break the circuit to the heating element 120. Continued rotation of lever 52 will be absorbed by the bending of leaf spring 40, thus compensating for possible over-travel in the control device. This interaction of the levers 38 and 52 de-energizes the heating element 120 when the garbage or the paper in which it is wrapped flashes into flame. After the readily inflammable components of the garbage, and the paper in which the garbage was wrapped, have burned the temperature in the flue 109 will begin to decrease. Any decreases in temperature will cause the smoothly rounded upper end of rod 28 to move upwardly, and sufficient decreases in temperature will cause that end of rod 28 to press against lever 52 and cause it to rotate in a clockwise direction. Such rotation will move the projection 51 of lever 52 downwardly; and it can move that projection out of engagement with leaf spring 40, thus permitting lever 38 to move in a counter-clockwise direction and release button 17. Where this is done, the electrical contacts in switch 16 will be brought together and the heating element 120 re-energized. The renewed heat from the heating element 120 will gradually dry out and burn all of the garbage in the unit; and thereafter the temperature in the flue 109 will decrease to the point where the shoulder 63 of latch 62 will be moved upwardly into contact with tongue 47 of lever 38 and will force the button 43 on lever 38 to move button 17 of switch 16 into circuit opening position.

Cylinder 22 and rod 28 are formed of such materials, and are dimensioned in such a way that heat from the heating element 120 alone is not sufficient to keep the upper end of rod 28 spaced from lever 52. Instead, the upper end of rod 28 will move upwardly and assume the position shown in Fig. 2, despite heat from the heating element 120; and once the rod 28 has assumed that position, the heating element 120 will be de-energized. When the latch 62 is tripped, by pressing down on the lamp housing 92, the lever 38 can move independently of the position of the upper end of rod 28 and can permit energization of heating element 120. However, as the garbage or the paper in which it is wrapped begins to burn, the upper end of rod 28 will begin to move downwardly; and continued burning of the garbage and paper can successively reset the latch 62 and cause circuit opening rotation of lever 38. Of course, if the temperature does not rise unduly, the burning of the garbage and paper will merely reset the latch 62; and the heating element 120 will continue to be energized until all of the garbage has been consumed. From this it is apparent that the control device of the present invention maintains the heating element 120 energized as long as the temperature in flue 109 is in an intermediate range, and de-energizes that heating element whenever the temperature in that flue rises above or falls below that temperature range.

The various components of the control device of the present invention can be dimensioned and proportioned to enable the control device to provide almost any desired temperature range. In fact, by using a switch wherein the contacts were brought together when the button 17 was forced into retracted position, the control device of the present invention could be made to open a circuit when the temperature was in an intermediate range and to close that circuit when the temperature rose above or fell below that range. However, for use with garbage disposal units similar to the unit shown in Fig. 3, it is desirable to dimension and proportion the components of the control device so the circuit to the heating element 120 will be closed when the temperature in the flue 109 is in the range of one hundred and twenty to three hundred (120-300) degrees Fahrenheit, and will be opened when the temperature in flue 109 is above or below that range. This range of temperatures is adequate to dry out and burn garbage and yet not injure the heating element 120.

In Fig. 4, three time-temperature curves are shown which were obtained by inserting the heat-responsive element of a recording thermometer in the flue 109 of a garbage disposal unit that was provided with the control device of Figs. 1 and 2. That control device was calibrated so the upper limit of the temperature range was at or about three hundred (300) degrees Fahrenheit in each case, and the reset temperature was at or about two hundred (200) degrees in each case; but the lower limit of the temperature range was varied in each case to illustrate operations at different temperatures. The numeral 128 marks the beginning of a garbage disposal cycle, and at that point the temperature was approximately eighty (80) degrees Fahrenheit. As the heating element 120 began to heat, the temperature in the disposal unit began to rise and part of the garbage and paper began to burn. The temperature in flue 109 was thus caused to trace the line between numerals 128 and 130; and at point 130 the temperature of the control device was high enough to cause latch 62 to reset itself. The latch 62 is intended to and does, reset itself when the temperature of the cylinder 22 and rod 28 is at or about two hundred (200) degrees Fahrenheit. Examination of Fig. 4 will show that the temperature in flue 109 was about two hundred and ten (210) degrees Fahrenheit when the latch 62 reset itself and had been much higher; but it will be understood that the thermal lag, common to all thermally responsive devices, enabled the temperature in flue 109 to rise more rapidly than the temperature of cylinder 22 and rod 28 rose.

The heating element 120 remained energized when the latch 62 reset itself at point 130, and heat from that element and from the garbage or its paper wrappings caused other portions of the garbage and paper to flash into flame. This flame raised the temperature in flue 109 to point 132, causing the control device to de-energize heating element 120. Here again the thermal lag of the control device is indicated because that device is calibrated to de-energize the heating element when the temperature reaches three hundred (300) degrees Fahrenheit. Actually, the control device did de-energize the heating element 120 when the temperature of the cylinder 22 and the rod 28 reached three hundred (300) degrees Fahrenheit, but at that time the temperature in the flue was about seven hundred (700) degrees Fahrenheit. This time lag is not objectionable since it can be taken into account in the proportioning and dimensioning of the control device. As a matter of fact, the thermal lag is beneficial in preventing response to temperature fluctuations of very short duration.

After the control device operated, at point 132, to de-energize the heating element, the garbage and paper continued to burn hotly for a few minutes. Thereafter, the temperature decreased; and at point 134 the temperature was low enough so rod 28 could move upwardly and rotate the projection 51 of lever 52 away from leaf spring 40, thus permitting button 17 to move down and re-energize the heating element 120. The combined heat from the heating element 120 and the burning garbage and paper then caused complete combustion of all the garbage; whereupon the temperature dropped to point 136, and the heating element 120 was de-energized. In this particular instance the control device was calibrated to, and did, de-energize the heating element at or about one hundred and eighty-five (185) degrees Fahrenheit. Upon the de-energization of the heating element 120, the temperature in flue 109 decreased to the neighborhood of room temperature.

Thereafter, a new quantity of garbage was inserted in the disposal unit and the lamp housing 92 was pressed down to trip the latch 62. This was done at point 138; and the second garbage disposal cycle included resetting of latch 62 at point 140, de-energizing heating element 120 at point 142, re-energizing heating element 120 at point 144, and finally de-energizing the heating element 120 at point 146 after all of the garbage had been consumed. The temperature at point 146 is different from that at point 136, but this is because the calibration of the control device was changed. Subsequent to the de-energization of the heating element 120 at point 146, the temperature in flue 109 dropped again to room temperature.

A third quantity of garbage was then placed in the garbage disposal unit at point 148, and the lamp housing 92 was again pressed down to trip latch 62. Thereafter the third garbage disposal cycle occurred; and that cycle included resetting the latch 62 at point 150, de-energizing the heating element at point 152, and re-energizing the heating element at point 154. The low temperature cut-off point for the third cycle is not shown but it was similar to points 136 and 146.

The graph in Fig. 4 indicates that the length of time for different garbage disposal cycles will be different. That variation is due to the nature, quantity, and water content of the garbage and the nature, quantity and water content of the wrappings therefor. In some instances, as with the first cycle, the total time is only fifty (50)

minutes. In other instances, as with the second cycle, the total time is as much as four (4) hours. As a result, the advantages of using a thermally-responsive control device rather than a timed or manual means to control the energization and de-energization of the heating element becomes quite clear. Although the duration and individual temperatures vary with each garbage disposal cycle, those cycles all include a manual initiation, an automatic resetting of the latch, and an automatic de-energization of the heating element when all of the garbage has been consumed. In addition, each of the cycles can have one or more de-energizations and re-energizations of the heating element at high temperatures.

A schematic diagram of the circuit of the switch 16, lamp 82, and heating element 120 of the control device is shown. In that diagram, current from line conductor 156 passes through switch 16 and divides; part going directly through the heating element 120, and part going through the lamp 82. The current recombines at the right hand side of heating element 120 and passes to line conductor 158. With this circuit, the lamp 82 is in parallel with the heating element 120 and will always be lighted when the heating element 120 is energized. For low current consumption, a small neon tube is preferred for lamp 82, but obviously any form of lamp could be used.

Whereas a preferred embodiment of the present invention has been shown and described in the drawing and accompanying description, it should be obvious to those skilled in the art that various changes can be made in the form of the invention without affecting the scope thereof.

What I claim is:

1. A control device that comprises a plurality of relatively movable electrical contacts, a resilient element biasing said contacts toward closed circuit position, a thermally responsive element, an actuating lever that is movable in one direction to move said contacts to open circuit position and is movable in a second direction to permit said resilient element to close said contacts, a second actuating lever that is movable in response to changes in the condition of said thermally responsive element, and a latch that extends between said levers and can cause movement of said first lever in said one direction in response to movement of said second lever, said thermally responsive element being operable at a predetermined temperature to move said second actuating lever and to act through said second actuating lever and said latch to cause said first actuating lever to move in said one direction and thereby move said contacts to open circuit position.

2. A control device that comprises a plurality of electrical contacts which are movable relative to each other to open and close a circuit and thus control the energization and de-energization of an electrically operated device, a resilient element biasing said contacts toward closed circuit position, a thermally responsive element, a rotatable lever that is movable by said thermally responsive element, a second rotatable lever that is adjacent to said first lever and is movable in one direction to move said contacts to open circuit position but is movable in a second direction to permit said resilient element to close said contacts, and a latch that extends between said rotatable levers, said thermally responsive element being responsive to the temperature of said electrically operated device to move said first rotatable lever and to act through said first rotatable lever and said latch to cause said second lever to move and urge said electrical contacts to open circuit position.

3. A control device that comprises a plurality of relatively movable electrical contacts, a resilient element biasing said contacts toward closed circuit position, a thermally responsive element, an actuating lever that is movable in one direction to cause separation of said contacts and is movable in a second direction to permit closing of said contacts, a second actuating lever that is movable in response to changes in the condition of said thermally responsive element, and a latch that extends between said levers and is normally in register with a portion of said first actuating lever to hold said levers spaced apart a predetermined minimal distance, whereby movement of said second actuating lever can normally move said first actuating lever in said one direction and move said contacts to open circuit position, said thermally responsive element being operable at a predetermined temperature to move said second actuating lever, and to act through said second actuating lever and said latch to cause said first actuating lever to move in said one direction and thereby move said contacts to open circuit position, said latch being movable out of register with said portion of said first actuating lever to permit said first actuating lever to move in said other direction and thereby permit said contacts to move to closed circuit position at said predetermined temperature.

4. A control device that comprises a plurality of members which are movable relative to each other to control the energization and de-energization of a thermal device, a thermally responsive element, actuating elements that are between said thermally responsive element and said members and are operable by said thermally responsive element to move said members relative to each other, said members being biased to energizing position, and a tripping element normally acting to maintain a predetermined distance between said actuating elements and to transmit the force applied on one of said actuating elements by said thermally responsive element to another of said actuating elements, said actuating elements and said tripping element being operable by said thermally responsive element at a predetermined temperature to move said members to de-energizing position, said tripping element being operable to permit said actuating elements to move relative to each other and relieve the force exerted on said other actuating element, and thereby said members to move to energizing position at said temperature.

5. A control device that comprises a plurality of members which are movable relative to each other to control the energization and de-energization of a thermal device, a resilient element biasing said members toward energizing position, a thermally responsive element which is responsive to the temperature of said thermal device, an actuating element adjacent to and movable by said thermally responsive element, a latch movable by said actuating element, an actuator that maintains said members in inoperative condition but is movable to permit said members to move to energizing position, a resilient element that normally holds said latch in register with said actuator, and a manually operable tripping element that can move said latch out of register with said actuator, said actuating element and said latch being positioned between said actuator and said thermally responsive element and transmitting force from said thermally responsive element to said actuator, said actuating element and said latch being operable in response to the condition of said thermally responsive element at one temperature to maintain said members in inoperative condition, said latch being movable by said tripping element out of register with said actuator to permit said actuator to move and thereby permit said members to move to energizing position, said latch being automatically moved back into register with said actuator by said resilient element when said thermally responsive element reaches a predetermined temperature.

6. A control device that comprises a plurality of separable elements, a pivoted lever that is rotatable to determine the relative position of said elements said lever being rotatable in one direction to move said elements to open position and being rotatable in the opposite direction to move said elements to closed position, a second pivoted actuating lever adjacent said first lever, and a thermally responsive element adjacent said second lever, said second lever having two bearing points thereon that are selectively engageable with said first lever, said two bearing points being positioned on the same side of the pivot for said first lever and being dimensioned so rotation of said second lever can rotate said first lever and thereby cause said elements to move consecutively from open to closed position and then from closed to open position, said thermally responsive element being operable in response to a change in temperature to rotate said second lever in one direction, thus causing said levers to consecutively move said separable elements from open to closed position and then from closed to open position.

7. A control device that comprises a switch with an operating button projecting therefrom, a rotatable lever that is positioned adjacent to and is adapted to bear against said button of said switch and thereby operate said switch, a second lever that is positioned adjacent to and is adapted to bear against and rotate said first lever, a thermally responsive element that is adjacent to and is adapted to bear against and rotate said second lever, and a latch which extends between said levers and normally transmits force from said second lever to said first lever but is capable of being disabled to permit movement of said first lever independent of said second lever.

LAWRENCE M. PERSONS.

REFERENCES CITED

The following references are of record in the file of this patent:

UNITED STATES PATENTS

| Number | Name | Date |
|---|---|---|
| 1,795,149 | Shivers | Mar. 3, 1931 |
| 1,942,699 | Henning | Jan. 9, 1934 |
| 1,974,991 | Hutt | Sept. 25, 1934 |
| 2,089,081 | Wemple | Aug. 3, 1937 |
| 2,255,220 | Joesting et al. | Sept. 9, 1941 |